United States Patent
Zhao et al.

(10) Patent No.: US 10,554,353 B2
(45) Date of Patent: Feb. 4, 2020

(54) PULSE SHAPING METHOD, TRANSMITTER, RECEIVER, AND SYSTEM

(71) Applicant: Huawei Technologies Co., Ltd., Shenzhen, Guangdong (CN)

(72) Inventors: Zhao Zhao, Munich (DE); Qi Wang, Munich (DE); Yi Long, Beijing (CN); Zhiheng Guo, Beijing (CN); Xingqing Cheng, Beijing (CN); Long Qin, Shanghai (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 16/147,410

(22) Filed: Sep. 28, 2018

(65) Prior Publication Data
US 2019/0036657 A1 Jan. 31, 2019

Related U.S. Application Data

(63) Continuation of application No. PCT/CN2017/078991, filed on Mar. 31, 2017.

(30) Foreign Application Priority Data

Mar. 31, 2016 (CN) .......................... 2016 1 0200453

(51) Int. Cl.
*H04L 5/00* (2006.01)
*H04L 12/24* (2006.01)
*H04B 1/38* (2015.01)

(52) U.S. Cl.
CPC ............... *H04L 5/001* (2013.01); *H04B 1/38* (2013.01); *H04L 41/08* (2013.01)

(58) Field of Classification Search
CPC ..... H04L 5/001; H04L 41/08; H04L 27/2627; H04L 5/0007; H04L 25/0384; H04B 1/38
See application file for complete search history.

(56) References Cited

U.S. PATENT DOCUMENTS 5,422,952 A * 6/1995 Kennedy .................. H04B 1/38
370/342
8,571,136 B1 10/2013 Mahmoud et al.
(Continued)

FOREIGN PATENT DOCUMENTS

CN 101098327 A 1/2008
CN 104995885 A 10/2015
(Continued)

OTHER PUBLICATIONS

Mizutani et al., "Universal-Windowed Orthogonal Frequency Division Multiplexing" IEICE Technical Report, vol. 115 No. 386, Japan, The Institute of Electronics, Information and Communication Engineers, Dec. 14, 2015, 6 pages.
(Continued)

*Primary Examiner* — Jean B Corrielus
(74) *Attorney, Agent, or Firm* — Fish & Richardson P.C.

(57) ABSTRACT

This application discloses a pulse shaping method, a transmitter, a receiver, and a system. The transmitter includes an inverse Fourier transform module, a pulse shaping filter, a pulse shaping controller, and a parallel-to-serial conversion module. The pulse shaping controller is configured to: receive pulse configuration signaling, generate, based on the pulse configuration signaling, a pulse parameter corresponding to a to-be-configured pulse, and output the pulse parameter to the pulse shaping filter. The pulse shaping filter is configured to: perform subcarrier-level filtering on an output signal of the inverse Fourier transform module, perform pulse shaping processing on the output signal of the inverse Fourier transform module based on the pulse parameter, and output a processed signal in serial by using the P/S module. Different pulse parameters correspondingly represent different pulse shapes. In the foregoing solution, pulse shaping
(Continued)

can be flexibly configured, to support different communication scenarios.

18 Claims, 10 Drawing Sheets

(56) References Cited

U.S. PATENT DOCUMENTS

| | | | |
|---|---|---|---|
| 2004/0086027 A1* | 5/2004 | Shattil | H04L 25/03834 375/146 |
| 2008/0002645 A1 | 1/2008 | Seki et al. | |
| 2008/0118012 A1 | 5/2008 | Corke et al. | |
| 2011/0058471 A1 | 3/2011 | Zhang | |
| 2014/0064407 A1 | 3/2014 | Dandach et al. | |
| 2015/0341201 A1 | 11/2015 | Funada et al. | |
| 2015/0372843 A1 | 12/2015 | Bala et al. | |
| 2016/0112229 A1 | 4/2016 | Lin et al. | |

FOREIGN PATENT DOCUMENTS

| | | |
|---|---|---|
| JP | 2014511062 A | 5/2014 |
| JP | 2014135647 A | 7/2014 |
| JP | 2018007056 A | 1/2018 |
| WO | 2009/136335 A3 | 7/2010 |
| WO | 2014123926 A1 | 8/2014 |
| WO | 2014191693 A1 | 12/2014 |

OTHER PUBLICATIONS

Office Action issued in Japanese Application No. 2018-551129 dated Oct. 11, 2019, 9 pages (With English Translation).

\* cited by examiner

PULSE SHAPING METHOD, TRANSMITTER, RECEIVER, AND SYSTEM

CROSS-REFERENCE TO RELATED APPLICATIONS

This application is a continuation of International Application No. PCT/CN2017/078991 filed on Mar. 31, 2017, which claims priority to Chinese Patent Application No. 201610200453.8 filed on Mar. 31, 2016. The disclosures of the aforementioned applications are hereby incorporated by reference in their entireties.

TECHNICAL FIELD

This application relates to the communications field, and in particular, to a pulse shaping method, a transmitter, a receiver, and a system.

BACKGROUND

An orthogonal frequency division multiplexing (OFDM) system is a most widely applied communications system in recent years, for example, a Long Term Evolution (LTE) system.

Compared with the LTE communications system, a next-generation communications system not only needs to be improved in performance, but also needs to support a new service type through a new air interface design. In addition to a conventional mobile broadband (MBB) service, the next-generation communications system further needs to support machine-to-machine (M2M) communication, man-computer communication (MCC), and other diversified new services such as ultra-reliable and low latency communications (URLLC) and massive machine type communications (MMTC). A new air interface technology includes technologies in a plurality of dimensions such as coding, a waveform, multiple access, and a frame structure. A waveform technology is a key to flexibly supporting a plurality of services, and is very important for a new air interface of a 5G system.

An orthogonal frequency division multiplexing (OFDM) technology based on a cyclic prefix (CP), that is, CP-OFDM, has a good anti-multipath interference capability and has a good compatibility with various MIMO technologies. An existing OFDM system usually uses the CP-OFDM as a specific solution for a multi-carrier waveform. However, in the CP-OFDM system, a rectangular window is fixedly used for windowing processing. This has obvious defects in suppressing indicators such as an adjacent channel leakage ratio (ACLR) and out-of-band (OOB) power leakage, and leads to an undiversified pulse shape. Therefore, the CP-OFDM system cannot flexibly support a plurality of communication scenarios.

SUMMARY

This application provides a pulse shaping method, a transmitter, a receiver, and a system, to implement flexible configuration for pulse shaping, and support different communication scenarios.

According to a first aspect, this application provides a transmitter, and the transmitter includes an inverse Fourier transform (IFT) module, a pulse shaping filter, a pulse shaping controller, and a parallel-to-serial conversion (P/S) module, where the inverse Fourier transform module is configured to: perform inverse Fourier transform on a baseband modulation signal obtained after serial-to-parallel conversion, and output a transformed signal to the pulse shaping filter;

the pulse shaping controller is configured to: receive pulse configuration signaling, generate, based on the pulse configuration signaling, a pulse parameter corresponding to a to-be-configured pulse, and output the pulse parameter to the pulse shaping filter;

the pulse shaping filter is configured to: perform subcarrier-level filtering on the output signal of the inverse Fourier transform module, perform pulse shaping processing on the output signal of the inverse Fourier transform module based on the pulse parameter, and output a processed signal to the P/S module; and the P/S module is configured to output the processed signal of the pulse shaping filter in serial.

With reference to the first aspect, in a first possible implementation of the first aspect, when a second flag bit $Flag_{tail}$ is equal to a second enable value, the pulse shaping filter includes an adding module and a windowing module;

the adding module is configured to: add a cyclic suffix of a second length to an OFDM symbol corresponding to the output signal of the inverse Fourier transform module, and output the OFDM symbol with the added cyclic suffix to the windowing module; and the windowing module is configured to: for a tail part of the OFDM symbol output by the adding module, perform windowing processing on the OFDM symbol at N sampling points of the tail part by using a latter part of a preset windowing function, and output the OFDM symbol obtained after the windowing processing, where N is a positive integer.

With reference to the first possible implementation of the first aspect, in a second possible implementation of the first aspect, when a first flag bit $Flag_{head}$ is equal to a first enable value, the pulse shaping filter further includes a calculation module;

the adding module is configured to: add a cyclic prefix of a first length to the OFDM symbol corresponding to the output signal of the inverse Fourier transform module, and output the OFDM symbol with the added cyclic prefix to the windowing module;

the windowing module is configured to: for a header part of the OFDM symbol output by the adding module, perform windowing processing on the OFDM symbol at M sampling points of the header part by using a former part of the preset windowing function, and output, to the calculation module, the OFDM symbol obtained after the windowing processing, where M is a positive integer; and the calculation module is configured to: add X sampling points of a tail part of a previous OFDM symbol and the OFDM symbol at X sampling points of a header part of the OFDM symbol obtained after the windowing processing, and output the OFDM symbol obtained after the adding, where X is a positive integer.

With reference to the first possible implementation of the first aspect or the second possible implementation of the first aspect, in a third possible implementation of the first aspect, the transmitter further includes: a storage module, configured to store, in a storage medium, Y sampling points of a tail part of the OFDM symbol obtained after the windowing processing, where Y is a positive integer.

With reference to the first aspect, the first possible implementation of the first aspect, the second possible implementation of the first aspect, or the third possible implementation of the first aspect, in a fourth possible implementation of the first aspect, the pulse shaping filter includes: a multi-phase register network, configured to: perform subcarrier-level filtering on the output signal of the inverse Fourier transform module based on a transmit-end filter coefficient determined based on a length K and a shape $P_{type}$ of the to-be-configured pulse, and output, to the parallel-to-serial conversion module, a plurality of subcarriers obtained after the filtering.

With reference to the first aspect, the first possible implementation of the first aspect, the second possible implementation of the first aspect, or the third possible implementation of the first aspect, in a fifth possible implementation of the first aspect, the pulse configuration signaling carries the pulse parameter, or the pulse configuration signaling carries indication information of the pulse parameter.

With reference to the first aspect, the first possible implementation of the first aspect, the second possible implementation of the first aspect, the third possible implementation of the first aspect, the fourth possible implementation of the first aspect, or the fifth possible implementation of the first aspect, in a sixth possible implementation of the first aspect, the pulse parameter includes all or a part of a preset parameter set, and the preset parameter set includes the first flag bit $Flag_{head}$, the second flag bit $Flag_{tail}$, a first value $N_1$, a second value $N_2$, the shape $P_{type}$ of the to-be-configured pulse, and the length K of the to-be-configured pulse relative to a single symbol period; and the first flag bit $Flag_{head}$ is used to indicate whether pulse shaping is performed on a symbol header, the second flag bit $Flag_{tail}$ is used to indicate whether pulse shaping is performed on a symbol tail, the first value $N_1$ is used to indicate a quantity of sampling points that are in a single symbol, on which pulse shaping is to be performed, and whose magnitude weights are not equal to 1, and the second value $N_2$ is used to indicate a quantity of sampling points that are outside a single symbol and on which pulse shaping is to be performed.

According to a second aspect, this application provides a receiver, and the receiver includes a serial-to-parallel conversion (S/P) module, a pulse shaping filter, a pulse shaping controller, and a Fourier transform module, where the S/P module is configured to output, in parallel to the pulse shaping filter, a communication signal that is input in serial;

the pulse shaping controller is configured to: receive pulse configuration signaling, generate, based on the pulse configuration signaling, a pulse parameter corresponding to a to-be-configured pulse, and output the pulse parameter to the pulse shaping filter;

the pulse shaping filter is configured to: perform subcarrier-level filtering on the output signal of the S/P module, perform pulse shaping processing on the output signal of the S/P module based on the pulse parameter, and output a processed signal to the Fourier transform module; and the Fourier transform module is configured to perform Fourier transform on the processed signal of the pulse shaping filter.

With reference to the second aspect, in a first possible implementation of the second aspect, when a second flag bit $Flag_{tail}$ is equal to a second enable value, the pulse shaping filter includes a windowing module and a removing module;

the windowing module is configured to: for a tail part of an OFDM symbol corresponding to the output signal of the S/P module, perform windowing processing on the OFDM symbol at N sampling points of the tail part by using a latter part of a preset windowing function, and output, to the removing module, the OFDM symbol obtained after the windowing processing, where N is a positive integer; and the removing module is configured to: remove a cyclic suffix of a second length for the OFDM symbol obtained after the windowing processing, and output the OFDM symbol obtained after the cyclic suffix is removed.

With reference to the first possible implementation of the second aspect, in a second possible implementation of the second aspect, when a first flag bit $Flag_{head}$ is equal to a first enable value, the pulse shaping filter further includes a calculation module;

the calculation module is configured to: for a header part of the OFDM symbol corresponding to the output signal of the S/P module, subtract X sampling points of a tail part of a previous OFDM symbol from the OFDM symbol at X sampling points of the header part, and output, to the windowing module, the OFDM symbol obtained after the subtracting;

the windowing module is configured to: for a header part of the OFDM symbol obtained after the subtracting, perform windowing processing on the OFDM symbol at M sampling points of the header part by using a former part of the preset windowing function, where M is a positive integer; and the removing module is configured to: remove a cyclic prefix of a first length for the OFDM symbol obtained after the windowing processing, and output the OFDM symbol obtained after the cyclic prefix is removed.

With reference to the first possible implementation of the second aspect or the second possible implementation of the second aspect, in a third possible implementation of the second aspect, the receiver further includes: a storage module, configured to store, in a storage medium, Y sampling points of the tail part of the OFDM symbol corresponding to the output signal of the S/P module, where Y is a positive integer.

With reference to the second aspect, the first possible implementation of the second aspect, the second possible implementation of the second aspect, or the third possible implementation of the second aspect, in a fourth possible implementation of the second aspect, the pulse shaping filter includes: a multi-phase register network, configured to: perform subcarrier-level filtering on the output signal of the S/P module based on a receive-end filter coefficient determined based on a length K and a shape $P_{type}$ of the to-be-configured pulse, and output, to the Fourier transform module, a plurality of subcarriers obtained after the filtering.

With reference to the second aspect, the first possible implementation of the second aspect, the second possible implementation of the second aspect, the third possible implementation of the second aspect, or the fourth possible implementation of the second aspect, in a fifth possible implementation of the second aspect, the pulse parameter includes all or a part of a preset parameter set, and the preset parameter set includes the first flag bit $Flag_{head}$, the second flag bit $Flag_{tail}$, a first value $N_1$, a second value $N_2$ the shape $P_{type}$ of the to-be-configured pulse, and the length K of the to-be-configured pulse relative to a single symbol period; and the first flag bit $Flag_{head}$ is used to indicate whether pulse shaping is performed on a symbol header, the second flag bit $Flag_{tail}$ is used to indicate whether pulse shaping is performed on a symbol tail, the first value $N_1$ is used to indicate a quantity of sampling points that are in a single symbol, on which pulse shaping is to be performed, and whose magnitude weights are not equal to 1, and the second value $N_2$ is used to indicate a quantity of sampling points that are outside a single symbol and on which pulse shaping is to be performed.

According to a third aspect, this application provides a pulse shaping method, and the method is applied to a transmit end and includes:

receiving pulse configuration signaling, and generating, based on the pulse configuration signaling, a pulse parameter corresponding to a to-be-configured pulse; and responding to the signaling, performing subcarrier-level filtering of the transmit end on a communication signal, and performing pulse shaping processing on the communication signal based on the pulse parameter.

With reference to the third aspect, in a first possible implementation of the third aspect, when a first flag bit $Flag_{head}$ is equal to a first enable value, the performing pulse shaping processing on the communication signal based on the pulse parameter specifically includes:

adding a cyclic prefix of a first length to an OFDM symbol corresponding to the communication signal;

for a header part of the OFDM symbol with the added cyclic prefix of the first length, performing windowing processing on the OFDM symbol at M sampling points of the header part by using a former part of a preset windowing function, where M is a positive integer;

adding X sampling points of a tail part of a previous OFDM symbol and the OFDM symbol at X sampling points of a header part of the OFDM symbol obtained after the windowing processing, where X is a positive integer; and performing parallel-to-serial conversion on a plurality of channels of signals corresponding to the OFDM symbol obtained after the adding, and outputting a converted signal.

With reference to the third aspect or the first possible implementation of the third aspect, in a second possible implementation of the third aspect, when a second flag bit $Flag_{tail}$ is equal to a second enable value, the performing pulse shaping processing on the communication signal based on the pulse parameter specifically includes:

adding a cyclic suffix of a second length to the OFDM symbol corresponding to the communication signal;

for a tail part of the OFDM symbol with the added cyclic suffix of the second length, performing windowing processing on the OFDM symbol at N sampling points of the tail part by using a latter part of the preset windowing function, where N is a positive integer; and storing, in a storage medium, Y sampling points of a tail part of the OFDM symbol obtained after the windowing processing, where Y is a positive integer.

With reference to the third aspect, in a third possible implementation of the third aspect, the performing pulse shaping processing on the communication signal based on the pulse parameter specifically includes:

performing subcarrier-level filtering on the communication signal based on a transmit-end filter coefficient determined based on a length K and a shape $P_{type}$ of the to-be-configured pulse.

With reference to the third aspect, the first possible implementation of the third aspect, the second possible implementation of the third aspect, or the third possible implementation of the third aspect, in a fourth possible implementation of the third aspect, the generating, based on the pulse configuration signaling, a pulse parameter corresponding to a to-be-configured pulse includes:

obtaining the pulse parameter carried in the pulse configuration signaling; or obtaining the pulse parameter based on indication information that is of the pulse parameter and that is carried in the pulse configuration signaling.

With reference to the third aspect, the first possible implementation of the third aspect, the second possible implementation of the third aspect, the third possible implementation of the third aspect, or the fourth possible implementation of the third aspect, in a fifth possible implementation of the third aspect, the pulse parameter includes all or a part of a preset parameter set, and the preset parameter set includes the first flag bit $Flag_{head}$, the second flag bit $Flag_{tail}$, a first value $N_1$, a second value $N_2$, the shape $P_{type}$ of the to-be-configured pulse, and the length K of the to-be-configured pulse relative to a single symbol period; and the first flag bit $Flag_{head}$ is used to indicate whether pulse shaping is performed on a symbol header, the second flag bit $Flag_{tail}$, is used to indicate whether pulse shaping is performed on a symbol tail, the first value $N_1$ is used to indicate a quantity of sampling points that are in a single symbol, on which pulse shaping is to be performed, and whose magnitude weights are not equal to 1, and the second value $N_2$ is used to indicate a quantity of sampling points that are outside a single symbol and on which pulse shaping is to be performed.

According to a fourth aspect, this application provides a pulse shaping method, and the method is applied to a receive end and includes:

receiving pulse configuration signaling, and generating, based on the pulse configuration signaling, a pulse parameter corresponding to a to-be-configured pulse; and responding to the signaling, performing subcarrier-level filtering of a transmit end on a communication signal, and performing pulse shaping processing on the communication signal based on the pulse parameter.

With reference to the fourth aspect, in a first possible implementation of the fourth aspect, when a first flag bit $Flag_{head}$ is equal to a first enable value, the performing pulse shaping processing on the communication signal based on the pulse parameter specifically includes:

subtracting X sampling points of a tail part of a previous OFDM symbol from an OFDM symbol at X sampling points of a header part of the OFDM symbol corresponding to the communication signal, where X is a positive integer;

for a header part of the OFDM symbol obtained after the subtracting, performing windowing processing on the OFDM symbol at M sampling points of the header part by using a former part of a preset windowing function, where M is a positive integer; and removing a cyclic prefix of a first length for the OFDM symbol obtained after the windowing processing.

With reference to the fourth aspect or the first possible implementation of the fourth aspect, in a second possible implementation of the fourth aspect, when a second flag bit $Flag_{tail}$ is equal to a second enable value, the performing pulse shaping processing on the communication signal based on the pulse parameter specifically includes:

for N sampling points of a tail part of the OFDM symbol corresponding to the communication signal, performing windowing processing on the OFDM symbol at the N sampling points by using a latter part of the preset windowing function, where N is a positive integer; and removing a cyclic suffix of a second length for the OFDM symbol obtained after the windowing processing.

With reference to the fourth aspect, in a third possible implementation of the fourth aspect, the performing pulse shaping processing on the communication signal based on the pulse parameter specifically includes:

performing subcarrier-level filtering on the communication signal based on a receive-end filter coefficient determined based on a length K and a shape $P_{type}$ of the to-be-configured pulse.

With reference to the fourth aspect, the first possible implementation of the fourth aspect, the second possible implementation of the fourth aspect, or the third possible implementation of the fourth aspect, in a fourth possible implementation of the fourth aspect, the generating, based on the pulse configuration signaling, a pulse parameter corresponding to a to-be-configured pulse includes:

obtaining the pulse parameter carried in the pulse configuration signaling; or obtaining the pulse parameter based on indication information that is of the pulse parameter and that is carried in the pulse configuration signaling.

With reference to the fourth aspect, the first possible implementation of the fourth aspect, the second possible implementation of the fourth aspect, the third possible implementation of the fourth aspect, or the fourth possible implementation of the fourth aspect, in a fifth possible implementation of the fourth aspect, the pulse parameter includes all or a part of a preset parameter set, and the preset parameter set includes the first flag bit $Flag_{head}$, the second flag bit $Flag_{tail}$, a first value $N_1$, a second value $N_2$, the shape $P_{type}$ of the to-be-configured pulse, and the length K of the to-be-configured pulse relative to a single symbol period; and the first flag bit $Flag_{head}$ is used to indicate whether pulse shaping is performed on a symbol header, the second flag bit $Flag_{tail}$ is used to indicate whether pulse shaping is performed on a symbol tail, the first value $N_1$ is used to indicate a quantity of sampling points that are in a single symbol, on which pulse shaping is to be performed, and whose magnitude weights are not equal to 1, and the second value $N_2$ is used to indicate a quantity of sampling points that are outside a single symbol and on which pulse shaping is to be performed.

According to a fifth aspect, this application provides a communications system, and the system includes a transmitter and a receiver, where the transmitter is the transmitter described in any possible implementation of the first aspect, and the receiver is the receiver described in any possible implementation of the second aspect.

According to the transmitter provided in this application, an upper layer on a transmitter side may send, to the pulse shaping controller based on different communication scenarios, pulse configuration signaling carrying different pulse parameters, to control the pulse shaping filter to configure different pulse shapes for the different communication scenarios, thereby flexibly accommodating the different communication scenarios. According to the receiver provided in this application, an upper layer on a receiver side may send, to the pulse shaping controller based on different communication scenarios, pulse configuration signaling carrying different pulse parameters, to control the pulse shaping filter in the receiver to configure different pulse shapes for the different communication scenarios, thereby flexibly accommodating the different communication scenarios.

BRIEF DESCRIPTION OF THE DRAWINGS

To describe technical solutions in this application more clearly, the following briefly describes the accompanying drawings required for describing the embodiments.

DETAILED DESCRIPTION

Terms used in the embodiments of this application are merely used to explain the specific embodiments of this application, but are not intended to limit this application.

First, several possible application scenarios related to this application are first described.

Figure 1A:
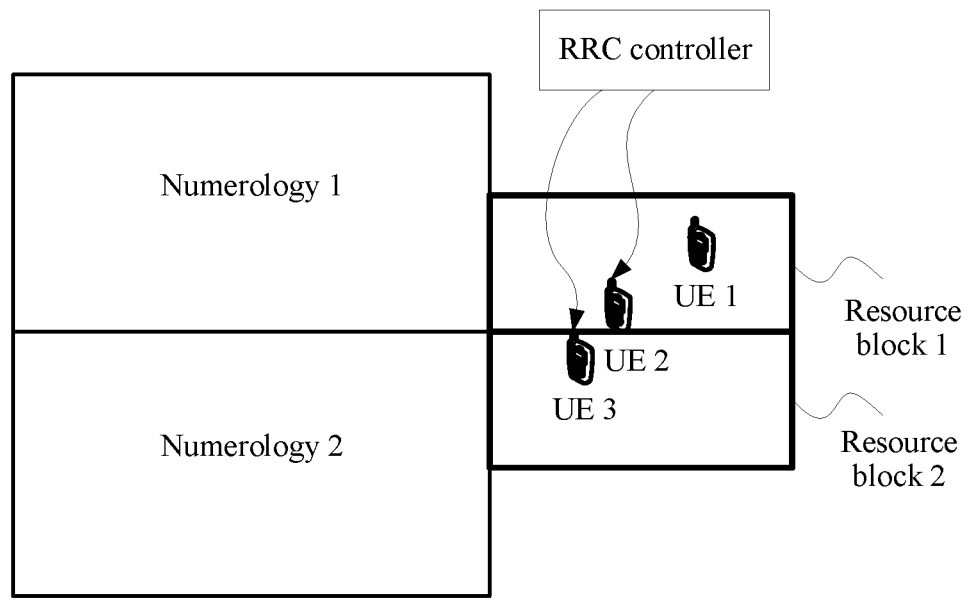
FIG. 1A is a schematic diagram of an application scenario according to this application.
Figure 1B:
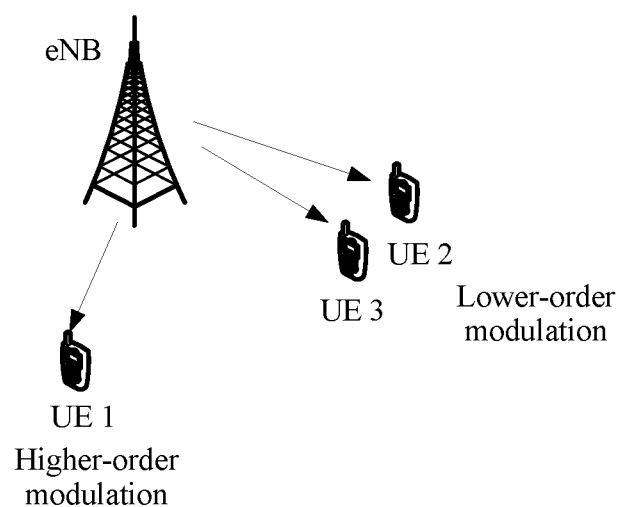
FIG. 1B is a schematic diagram of another application scenario according to this application.
Figure 1C:
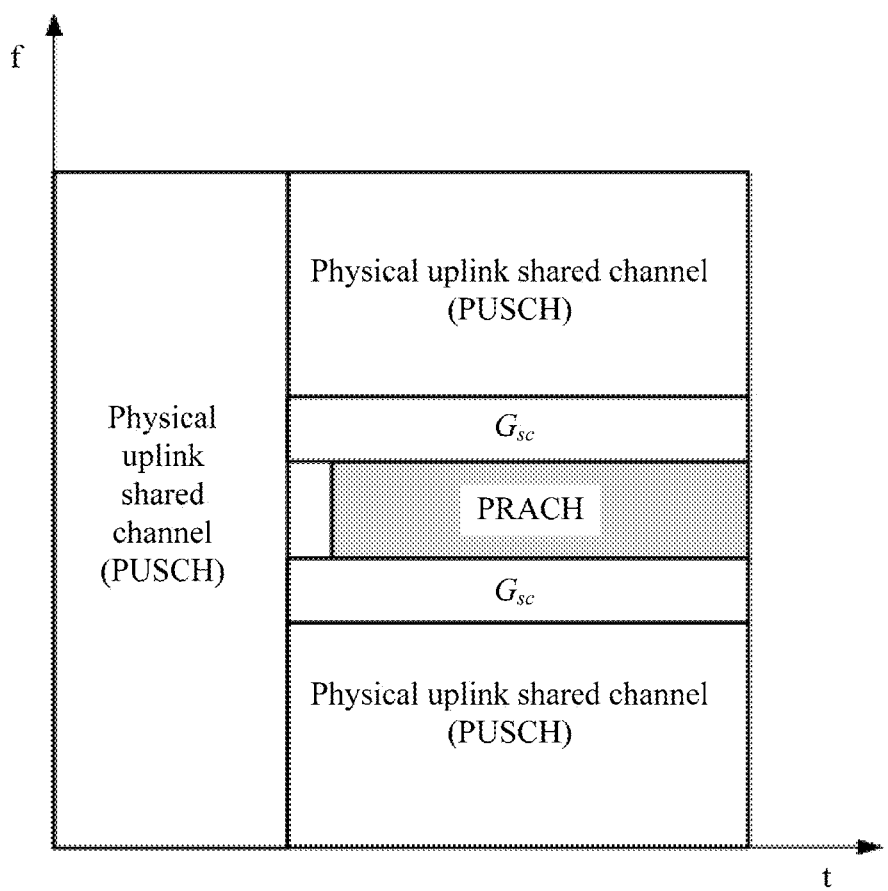
FIG. 1C is a schematic diagram of still another application scenario according to this application.

As shown in FIG. 1A to FIG. 1C, different communication scenarios have different requirements for a signal-to-noise ratio, an anti-interference capability, out-of-band power leakage, and the like of a communication signal. Therefore, pulse shaping processing processes corresponding to different pulse shapes (for example, a rectangular pulse, a Gaussian pulse, and a raised cosine pulse) need to be used to accommodate the different communication scenarios. Details are as follows:

In a scenario shown in FIG. 1A, during resource scheduling, different user equipments (UE) are allocated to different locations of resource blocks, and transmit data by using different OFDM numerologies (a group of values including an OFDM CP length and a subcarrier width). However, users (for example, UE 1 and UE 2) at a sideband of (or nearby) a resource block that correspond to different numerologies usually suffer from severe inter-subband interference. Therefore, when the solution in this application is implemented, data transmission of users corresponding to different numerologies may be provided with different pulse shapes for different pulse shaping processing, so that the users at the sideband of the resource block that correspond to the different numerologies can obtain a good communication environment.

In a scenario shown in FIG. 1B, a communications system adjusts a modulation and coding scheme (MCS) in real time based on channel quality information. It may be understood that a communication signal with a higher modulation order has a higher requirement for a signal-to-noise ratio. Therefore, when the solution of this application is implemented, pulse shaping processing may be performed on communication signals with different modulation orders by using different pulse shapes, so that a communication signal with a relatively high modulation order can also obtain a good signal-to-noise ratio.

In a scenario shown in FIG. 1C, different physical channels coexist. For example, a physical random access channel (PRACH) and a physical uplink shared channel (PUSCH) coexist. Compared with the PUSCH, the PRACH needs to support a relatively long multipath delay spread and have a relatively high anti-asynchronous capability. A guard frequency band $G_{sc}$ is usually reserved between the PRACH and another physical channel (for example, the PUSCH), to reduce inter-channel interference. Therefore, pulse shaping processing is performed on the PUSCH, the PRACH, and other different physical channels by using different pulse shapes, to reduce mutual interference between channels, reduce overheads of the guard frequency band $G_{sc}$, and support coexistence of physical channels with different requirements.

In addition, different pulse waveforms may be configured for different service types based on a service type corresponding to a communication signal, to perform flexible pulse shaping processing, and meet requirements of different services for communication performance.

It should be noted that this application may be further applied to another communication scenario in which a pulse shape needs to be dynamically configured to perform flexible pulse shaping processing. Details are not described herein.

It should be noted that pulse shaping in this application indicates subcarrier-level filtering (filtering for a subcarrier) performed on a communication signal s(t) meeting the following formula in an OFDM system, or is referred to as pulse shaping of an OFDM signal.

$$s(t) = \Sigma_m \Sigma_n a_{m,n} g_{tx}(t-nT) e^{2\pi j m F T}, \text{ where}$$

s(t) is the communication signal in the OFDM system, $a_{m,n}$ is data at an $m^{th}$ subcarrier and an $n^{th}$ symbol, T is an OFDM symbol period, F is an OFDM subcarrier spacing, and $g_{tx}$ indicates a transmit-end waveform or an (original) transmit pulse. A receive-end waveform or an (original) receive pulse corresponding to $g_{tx}$ may be represented as $\gamma_{rx}$. In an existing CP-OFDM system, the transmit-end waveform $g_{tx}$ and the receive-end waveform $\gamma_{rx}$ are fixed to a rectangle by default.

To resolve a problem caused because a rectangular window is fixedly used for pulse shaping in the existing OFDM communications system, this application provides a pulse shaping method, a transmitter, a receiver, and a system, to implement flexible configuration for pulse shaping, thereby supporting different communication scenarios. With reference to the accompanying drawings, the following describes in detail the pulse shaping method, the transmitter, the receiver, and the system that are provided in this application.

Figure 2:
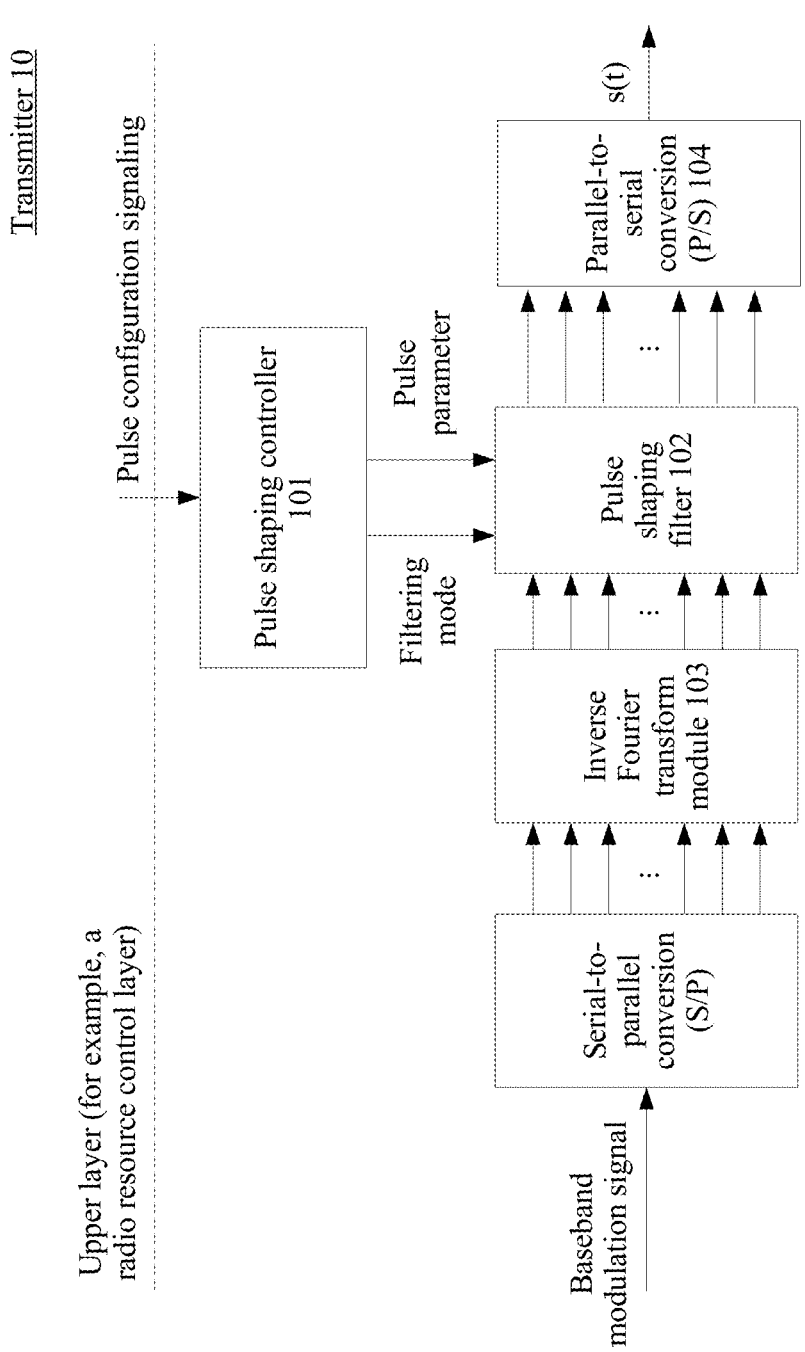
FIG. 2 is a schematic architectural diagram of a transmitter according to this application.

Referring to FIG. 2, FIG. 2 is a schematic architectural diagram of a transmitter according to this application. The transmitter is configured to perform pulse shaping processing on a communication signal at a transmit end. As shown in FIG. 2, the transmitter 10 may include a pulse shaping controller 101, a pulse shaping filter 102, an inverse Fourier transform (IFT) module 103, and a parallel-to-serial conversion (P/S) module 104.

The inverse Fourier transform module 103 may be configured to: perform inverse Fourier transform on a baseband modulation signal obtained after serial-to-parallel conversion, and output a transformed signal to the pulse shaping filter 102.

The pulse shaping controller 101 may be configured to: receive pulse configuration signaling, generate, based on the pulse configuration signaling, a pulse parameter corresponding to a to-be-configured pulse, and output the pulse parameter to the pulse shaping filter 102. The pulse shaping filter 102 may be configured to: perform subcarrier-level filtering on the output signal of the inverse Fourier transform module 103, perform pulse shaping processing on the output signal of the inverse Fourier transform module 103 based on the pulse parameter, and output a processed signal to the P/S module 104.

The P/S module 104 is configured to output the processed signal of the pulse shaping filter in serial.

It should be noted that FIG. 2 shows only a partial architecture of the transmitter 10. In actual application, the transmitter 10 may further include another module for signal modulation and signal transmission. Details are not described herein.

Specifically, the pulse configuration signaling may carry the pulse parameter, and the pulse parameter may be directly obtained from the signaling. Alternatively, the pulse configuration signaling may carry only indication information of the pulse parameter, and the pulse parameter may be obtained based on the indication information. For example, the signaling carries an index of the pulse parameter in a preset database, and the pulse shaping controller 101 is notified of the preset database in advance. Then, the pulse shaping controller 101 may find the pulse parameter from the preset database based on the index. The example is merely an implementation provided in this application, and shall not constitute a limitation. There may be different implementations in actual application.

In this application, the pulse parameter output by the pulse shaping controller 101 to the pulse shaping filter 102 may be all or a part of a preset parameter set. Specifically, the preset parameter set is shown in Table 1:

TABLE 1

| Parameter name | Definition | Typical Value | Relationship with other parameters |
|---|---|---|---|
| K | Length of a to-be-configured pulse relative to a single symbol period | 1, 1.05, 4, . . . , | $K = 1 + \dfrac{2N_2}{N_{sym}}$ |
| $P_{type}$ | Shape of a to-be-configured pulse | Raised cosine, Gaussian, rectangular | |
| $N_1$ | Quantity of sampling points that are in a single symbol, on which pulse shaping is to be performed, and whose magnitude weights are not equal to 1 | 20, 32 | If $P_{type}$ is a raised cosine, $N_1 \leq \dfrac{N_{CP}}{2}$, $N_2 \leq \dfrac{N_{CP}}{2}$, and |
| $N_2$ | Quantity of sampling points that are outside a single symbol and on which pulse shaping is to be performed | 40, 2048 | $\alpha = \dfrac{N_1 + N_2}{N_{CP} - N_1 + N_2}$. |
| $Flag_{head}$ | Indicate whether pulse shaping is performed on a symbol header | 0 (no), 1 (yes) | |
| $Flag_{tail}$ | Indicate whether pulse shaping is performed on a symbol tail | 0 (no), 1 (yes) | |

α indicates a roll-off factor of a raised cosine (RC) filter, $N_{CP}$ is a length of an OFDM cyclic prefix, and $N_{sym}$ is a quantity of sampling points corresponding to a single symbol period. It should be noted that Table 1 is merely an implementation of the embodiments of this application, and shall not constitute a limitation. There may be further different implementations in actual application.

In this application, the preset parameter set may further include some OFDM parameters predefined in a system, for example, $N_{CP}$, $N_{sym}$, or another parameter. This is not limited herein.

In this application, a group of pulse parameters correspondingly represent a specific pulse shape. As described in "Definition" in Table 1, the first flag bit $Flag_{head}$ may be used to indicate whether pulse shaping is performed on a symbol header, the second flag bit $Flag_{tail}$ may be used to indicate whether pulse shaping is performed on a symbol tail, $P_{type}$ may be used to indicate a shape of a to-be-configured pulse, and K may be used to indicate a length of a to-be-configured pulse relative to a single symbol period.

Figure 3:
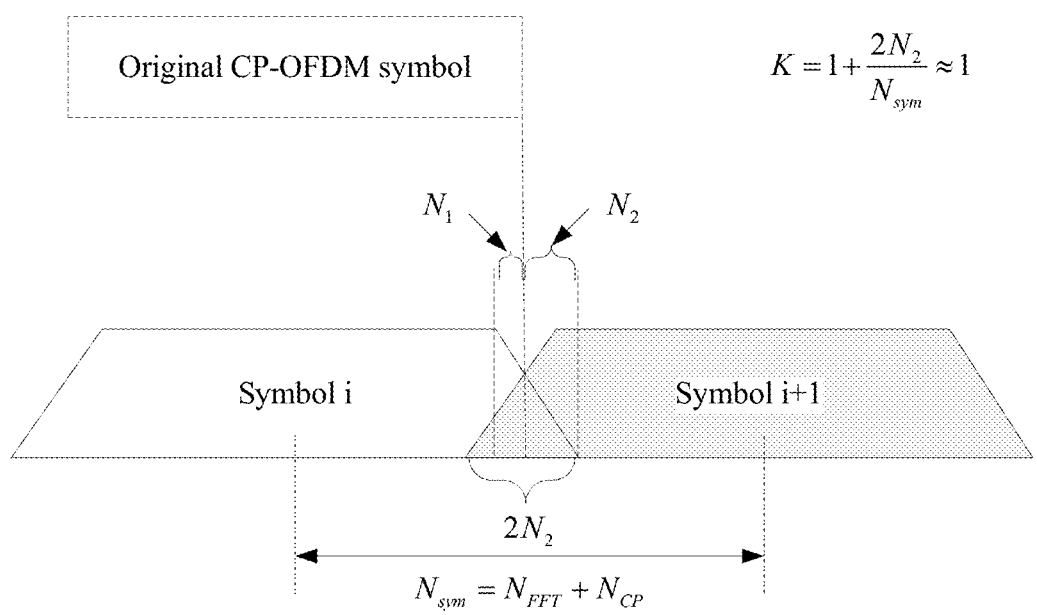
FIG. 3 is a schematic diagram of transmission of two adjacent symbols according to this application.

Indication meanings of the first value $N_1$ and second value $N_2$ may be shown in FIG. 3. The first value $N_1$ may be used to indicate a quantity of sampling points that are in a single symbol, on which pulse shaping is to be performed, and whose magnitude weights are not equal to 1, and the second value $N_2$ may be used to indicate a quantity of sampling points that are outside a single CP-OFDM symbol and on which pulse shaping is to be performed. A quantity of overlapping sampling points between two adjacent symbols (a symbol i and a symbol i+1) is $2N_2$.

In some possible implementations, if a first flag bit $Flag_{head}$ is equal to a first enable value, the first flag bit $Flag_{head}$ indicates that pulse shaping is performed on the symbol header; if the first flag bit $Flag_{head}$ is not equal to a first enabling value, the first flag bit $Flag_{head}$ indicates that pulse shaping is not performed on the symbol header. For example, as shown in Table 1, the first flag bit $Flag_{head}$ is a 1-bit flag bit, and the first enable value is 1. When $Flag_{head}$ is equal to 1, it indicates that pulse shaping is performed on the symbol header. When $Flag_{head}$ is equal to 0, it indicates that pulse shaping is not performed on the symbol header. The example is merely an implementation provided in this application, and shall not constitute a limitation. There may be further different implementations in actual application.

Similarly, in some possible implementations, if a second flag bit $Flag_{tail}$ is equal to a second enable value, the second flag bit $Flag_{tail}$ indicates that pulse shaping is performed on the symbol tail; if the first flag bit $Flag_{tail}$ is not equal to a first enabling value, the second flag bit $Flag_{tail}$ indicates that pulse shaping is not performed on the symbol tail.

It should be noted that the first enable value and the second enable value may be defined based on an actual requirement. This is not limited herein.

Figure 4:
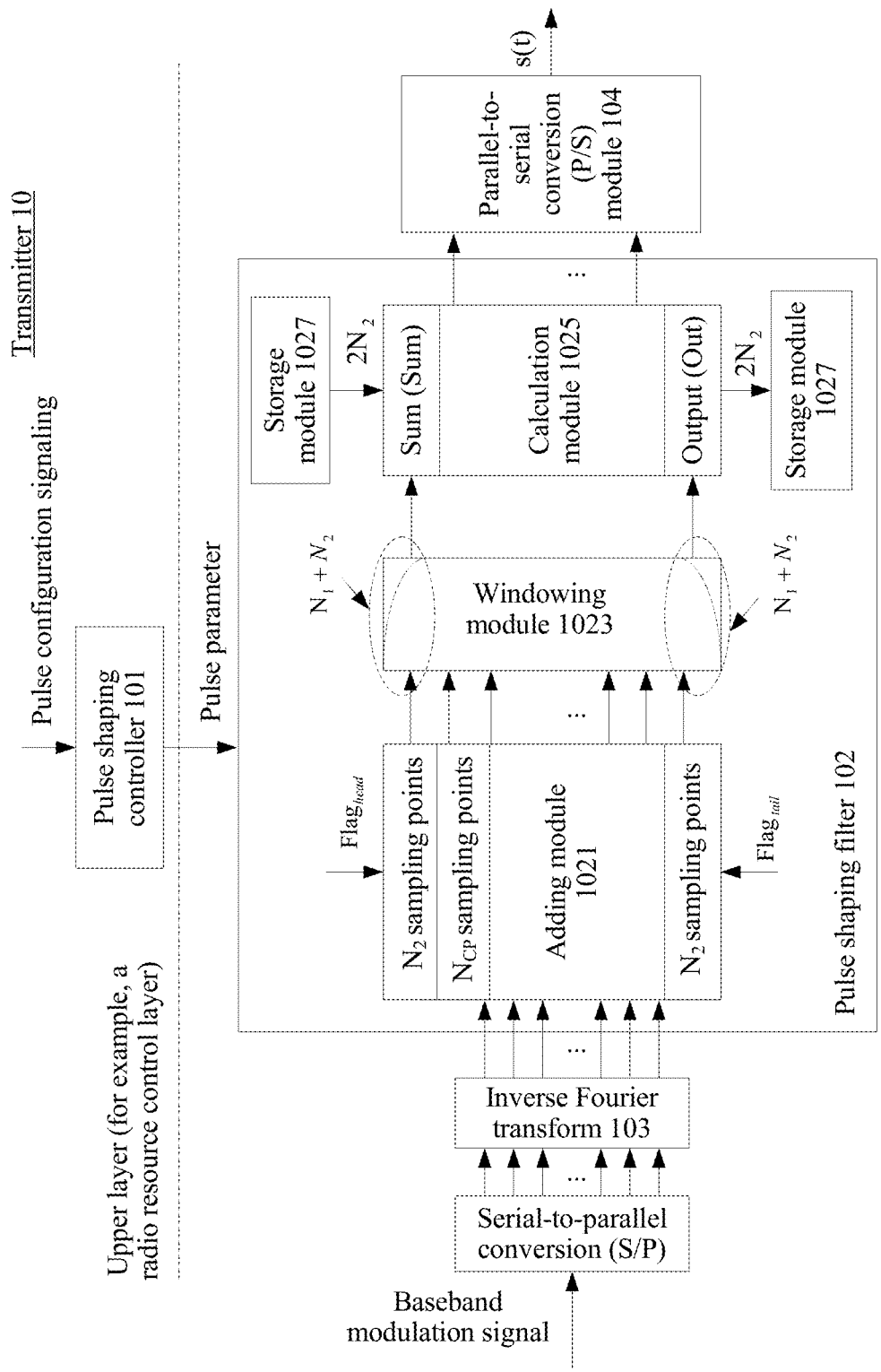
FIG. 4 is a schematic block diagram of implementing a transmitter according to this application.
Figure 5:
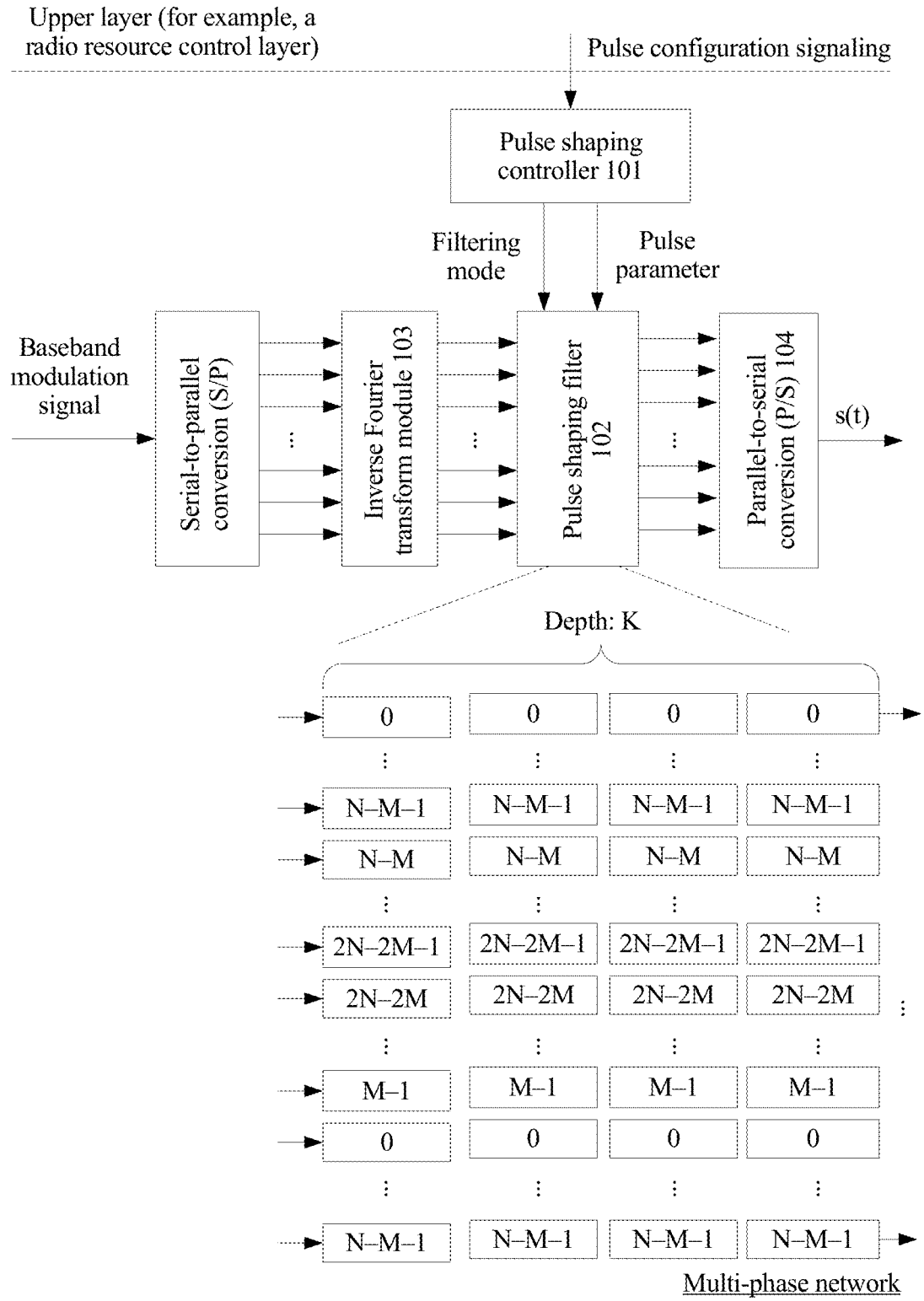
FIG. 5 is another schematic block diagram of implementing a transmitter according to this application.

The following further describes a specific implementation of the transmitter 10 provided in this application based on FIG. 4 and FIG. 5. A transmitter 10 corresponding to FIG. 4 is preferably applied to a scenario in which a pulse shape is in a relatively small length (for example, K≤2). A transmitter 10 corresponding to FIG. 5 is preferably applied to a scenario in which a pulse shape is in a relatively large length (for example, K>2).

In an implementation of this application, the transmitter 10 may be shown in FIG. 4. An inverse Fourier transform module 103, a parallel-to-serial conversion (P/S) module 104, and a pulse shaping controller 101 are consistent with the corresponding modules in the embodiment of FIG. 2. Details are not described again. As shown in FIG. 4, a pulse shaping filter 102 may further include an adding module 1021, a windowing module 1023, a calculation module 1025, and a storage module 1027.

When a first flag bit $Flag_{head}$ is equal to a first enable value (for example, "1"), the adding module 1021, the windowing module 1023, and the calculation module 1025 may be jointly configured to perform pulse shaping processing on a header of an OFDM symbol corresponding to an output signal of the inverse Fourier transform module 103.

The adding module 1021 may be configured to: add a cyclic prefix of a first length to the OFDM symbol, and output the OFDM symbol with the added cyclic prefix to the windowing module 1023.

For example, as shown in FIG. 4, the first length may be equal to $(N_{CP}+N_2)$. In actual application, the first length may alternatively be equal to a sum of NC and an integral multiple of $N_2$, for example, $(N_{CP}+2N_2)$. Alternatively, the first length may be another value. This is not limited herein.

The windowing module 1023 may be configured to: for a header part of the OFDM symbol, perform windowing processing on the OFDM symbol at M sampling points of the header part by using a former part of a preset windowing function (for example, a windowing function indicated by $P_{type}$), and output, to the calculation module 1025, the OFDM symbol obtained after the windowing processing, where M is a positive integer.

For example, as shown in FIG. 4, M may be equal to $(N_1+N_2)$. It should be noted that M may alternatively be another value based on an actual application requirement, for example, $(N_1+2N_2)$. This is not limited herein.

The calculation module 1025 may be configured to: add X sampling points of a tail part of a previous OFDM symbol and the OFDM symbol at X sampling points of a header part of the OFDM symbol obtained after the windowing processing, and output the OFDM symbol obtained after the adding, where X is a positive integer. It should be noted that the adding indicates that the X sampling points of the tail part of the previous OFDM symbol are added in time domain. For example, as shown in FIG. 4, X is equal to $2N_2$. It may be learned with reference to FIG. 3 that a physical meaning of $2N_2$ indicates that overlapping sampling points between the tail part of the previous OFDM symbol and the OFDM symbol are added to the header part of the OFDM symbol.

When a second flag bit $Flag_{tail}$ is equal to a second enable value (for example, "1"), the adding module 1021 and the windowing module 1023 may be further jointly configured to perform pulse shaping processing on a tail of the OFDM symbol corresponding to the output signal of the inverse Fourier transform module 103.

The adding module 1021 may be configured to: add a cyclic suffix of a second length to the OFDM symbol, and output the OFDM symbol with the added cyclic suffix to the windowing module 1023.

For example, as shown in FIG. 4, the second length may be equal to $N_2$. In actual application, the second length may alternatively be equal to a sum of $N_{CP}$ and an integral multiple of $N_2$, for example, $(N_{CP}+2N_2)$. Alternatively, the second length may be another value. This is not limited herein.

The windowing module 1023 may be configured to: for a tail part of the OFDM symbol output by the adding module 1021, perform windowing processing on the OFDM symbol at N sampling points of the tail part by using a latter part of the preset windowing function (for example, the windowing function indicated by $P_{type}$), and output the OFDM symbol obtained after the windowing processing, where N is a positive integer.

For example, as shown in FIG. 4, N may be equal to $(N_1+N_2)$. It should be noted that N may alternatively be another value based on an actual application requirement, for example, $(N_1+2N_2)$. This is not limited herein.

In addition, the storage module 1027 in the transmitter 10 shown in FIG. 4 may be configured to store, in a storage medium, Y sampling points of a tail part of the OFDM symbol obtained after the windowing processing. In specific implementation, Y may be equal to X, in other words, the X sampling points of the tail part of the previous OFDM symbol may be stored in the storage medium. In actual application, Y may alternatively be greater than X. This is not limited herein.

In 5G and future communication scenarios, uplink-downlink switching needs to be performed more frequently in a time division duplex (TDD) technology. A switching period is usually less than 1 millisecond. During the uplink-downlink switching, signal leakage may occur in time domain due to asynchronous systems, causing mutual interference between uplink and downlink. In this application, pulse shaping processing is performed on a tail of a last symbol of an uplink frame, or pulse shaping processing is performed on a header of a first symbol in a downlink frame. Therefore, smooth switching can be implemented between uplink and downlink data frames, thereby reducing interference between uplink and downlink.

In another implementation provided in this application, the transmitter 10 may be shown in FIG. 5. An inverse Fourier transform module 103, a parallel-to-serial conversion (P/S) module 104, and a pulse shaping controller 101 are consistent with the corresponding modules in the embodiment of FIG. 2. Details are not described again. As shown in FIG. 5, a pulse shaping filter 102 may include: a multi-phase register network, configured to perform subcarrier-level filtering on an output signal of the inverse Fourier transform module 103 based on a transmit-end filter coefficient determined based on a length K and a shape $P_{type}$ of a to-be-configured pulse, and output, to the parallel-to-serial conversion module 104, a plurality of subcarriers obtained after the filtering.

Specifically, as shown in FIG. 5, a depth of the multi-phase register network is consistent with the length K. The transmit-end filter coefficient $g_{tx}$ may be determined based on the length K and $P_{type}$. Input received by the multi-phase register network shown in FIG. 5 is n channels of signals output by the inverse Fourier transform module 103.

In still another implementation provided in this application, a transmitter 10 may include the pulse shaping filter in the embodiment of FIG. 4 and the pulse shaping filter in the embodiment of FIG. 5. The two filters both are connected to a pulse shaping controller 101 and an inverse Fourier transform module 103.

In a possible implementation, the pulse shaping filters in the embodiments respectively corresponding to FIG. 4 and FIG. 5 may be two hardware modules. The two hardware modules are independently integrated into the transmitter 10, and are separately connected to the pulse shaping controller. In actual application, the two hardware modules may alternatively be integrated into the pulse shaping controller as a part of the pulse shaping controller. This application does not limit a layout manner of the two hardware modules in a hardware architecture.

In another possible implementation, the pulse shaping filters in the embodiments respectively corresponding to FIG. 4 and FIG. 5 may be two software modules. The two software modules may run in the pulse shaping controller, or may run on another processing chip that can communicate with the pulse shaping controller. This application does not limit a running environment of the two software modules.

In still another implementation, the pulse shaping controller 101 may be further configured to: determine whether a length K is greater than a preset value (for example, 2); and if the length K is greater than the preset value, output a pulse parameter to the pulse shaping filter in the embodiment of FIG. 5, to trigger the pulse shaping filter in the embodiment of FIG. 5 to perform pulse shaping processing on a communication signal; or if the length K is less than or equal to the preset value, output a pulse parameter to the pulse shaping filter in the embodiment of FIG. 4, to trigger the pulse shaping filter in the embodiment of FIG. 4 to perform pulse shaping processing on a communication signal.

It may be understood that the pulse parameter used in the embodiment of FIG. 4 may be a subset of the preset parameter set shown in Table 1, to be specific, $\{N_1, N_2, Flag_{head}, Flag_{tail}\}$, or the pulse parameter used in the embodiment of FIG. 5 may be another subset of the preset parameter set shown in Table 1, to be specific, $\{K, P_{type}\}$.

In this application, the pulse configuration signaling received by the pulse shaping controller 101 may be signaling delivered by an upper layer, for example, a radio resource control (RRC) layer. In actual application, the pulse configuration signaling may alternatively be delivered to the pulse shaping controller 101 by an application layer in response to a user operation. A source and a generation manner of the pulse configuration signaling are not limited in this application.

In this embodiment of this application, the upper layer of the transmitter 10 may send, to the pulse shaping controller 101 based on different communication scenarios (as shown in FIG. 1A to FIG. 1C), pulse configuration signaling carrying different pulse parameters, to control the pulse shaping filter 102 to configure different pulse shapes for the different communication scenarios, thereby flexibly accommodating the different communication scenarios.

Figure 6:
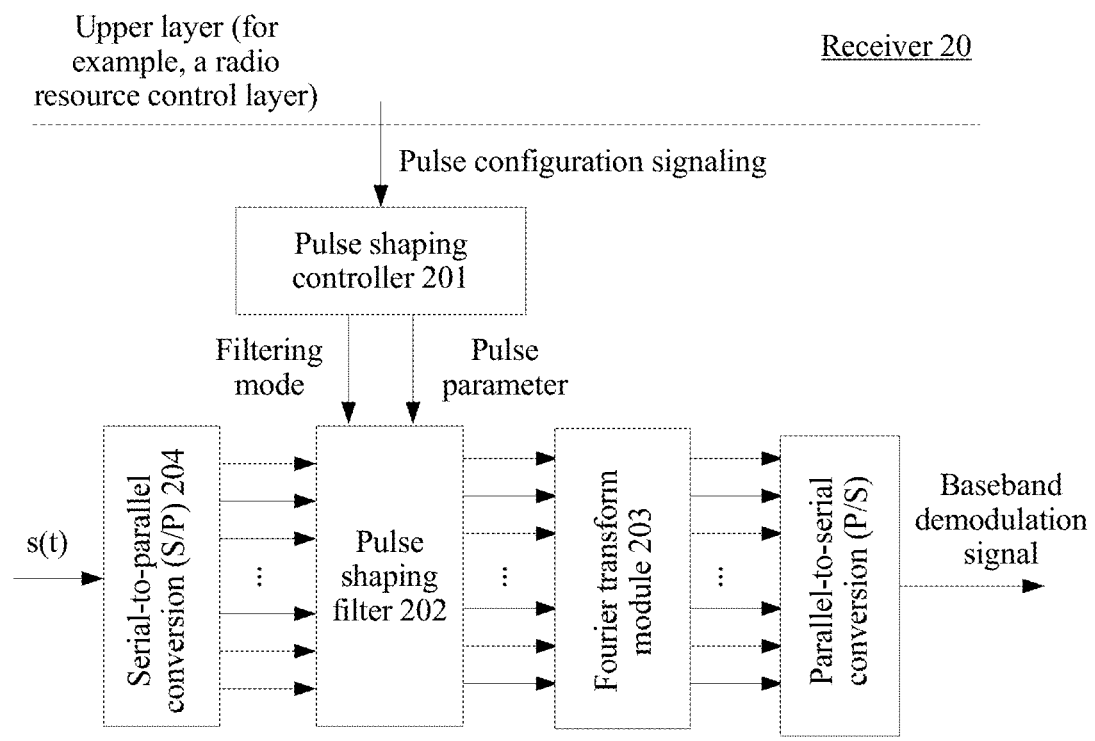
FIG. 6 is a schematic architectural diagram of a receiver according to this application.

This application further provides a receiver corresponding to the transmitter described in the foregoing content. The receiver is configured to perform pulse shaping processing on a communication signal at a receive end. Referring to FIG. 6, FIG. 6 is a schematic architectural diagram of a receiver according to this application. As shown in FIG. 6, the receiver 20 may include: a serial-to-parallel conversion (S/P) module 204, a pulse shaping filter 202, a pulse shaping controller 201, and a Fourier transform module 203.

The S/P module 204 may be configured to output, in parallel to the pulse shaping filter 202, a communication signal that is input in serial.

The pulse shaping controller 201 may be configured to: receive pulse configuration signaling, generate, based on the pulse configuration signaling, a pulse parameter corresponding to a to-be-configured pulse, and output the pulse parameter to the pulse shaping filter 202.

The pulse shaping filter 202 may be configured to: perform subcarrier-level filtering on the output signal of the S/P module 204, perform pulse shaping processing on the output signal of the S/P module 204 based on the pulse parameter, and output a processed signal to the Fourier transform module 203.

The Fourier transform module 203 may be configured to perform Fourier transform on the processed signal of the pulse shaping filter.

It should be noted that FIG. 6 shows only a partial architecture of the receiver 20. In actual application, the receiver 20 may further include another module for signal demodulation and signal receiving. Details are not described herein.

In this application, the pulse parameter output by the pulse shaping controller 201 to the pulse shaping filter 202 may be all or a part of a preset parameter set. Specifically, for the preset parameter set, refer to Table 1 and a related description in the embodiment of FIG. 2. Details are not described herein again.

Figure 7:
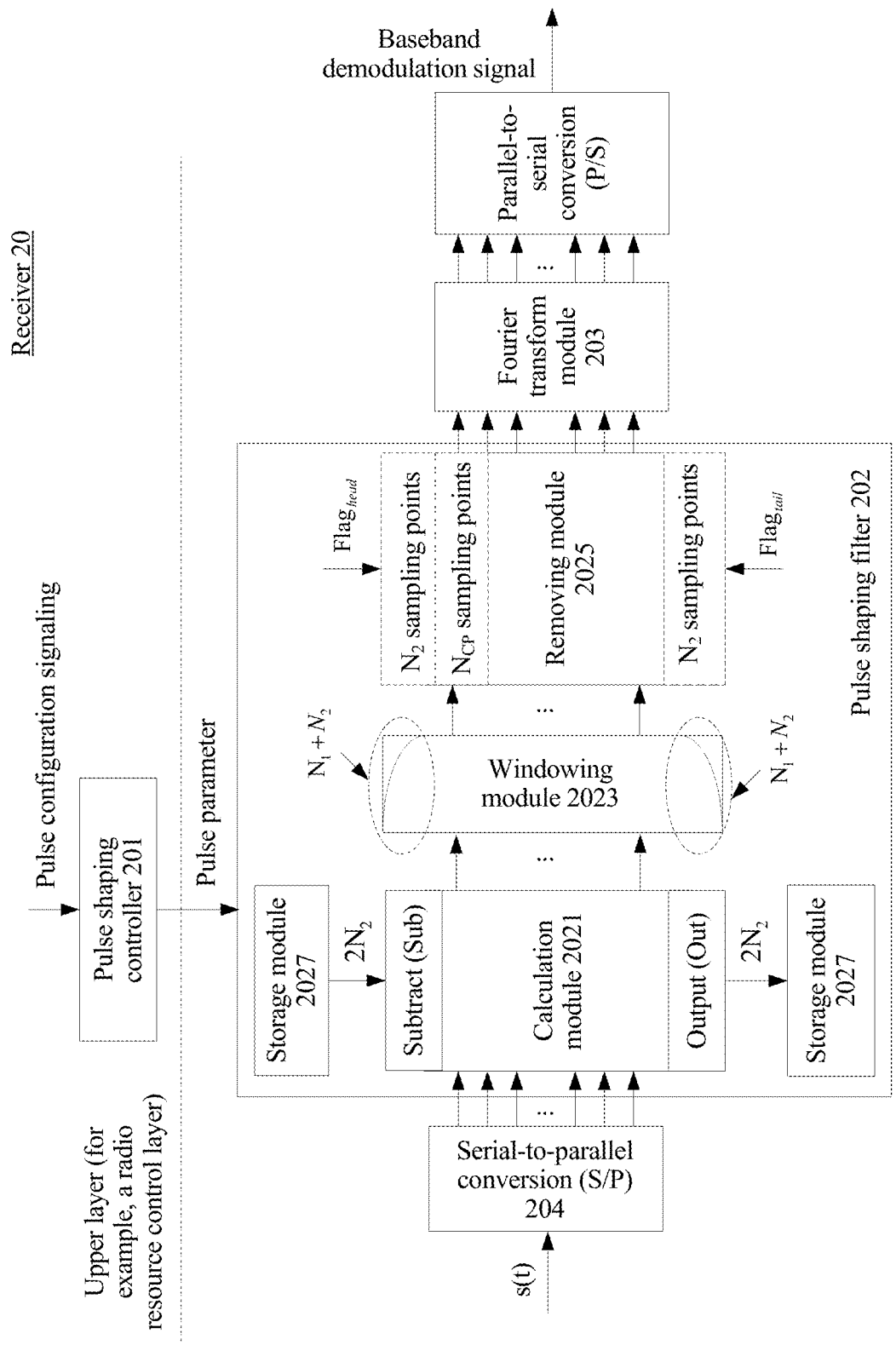
FIG. 7 is a schematic block diagram of implementing a receiver according to this application.
Figure 8:
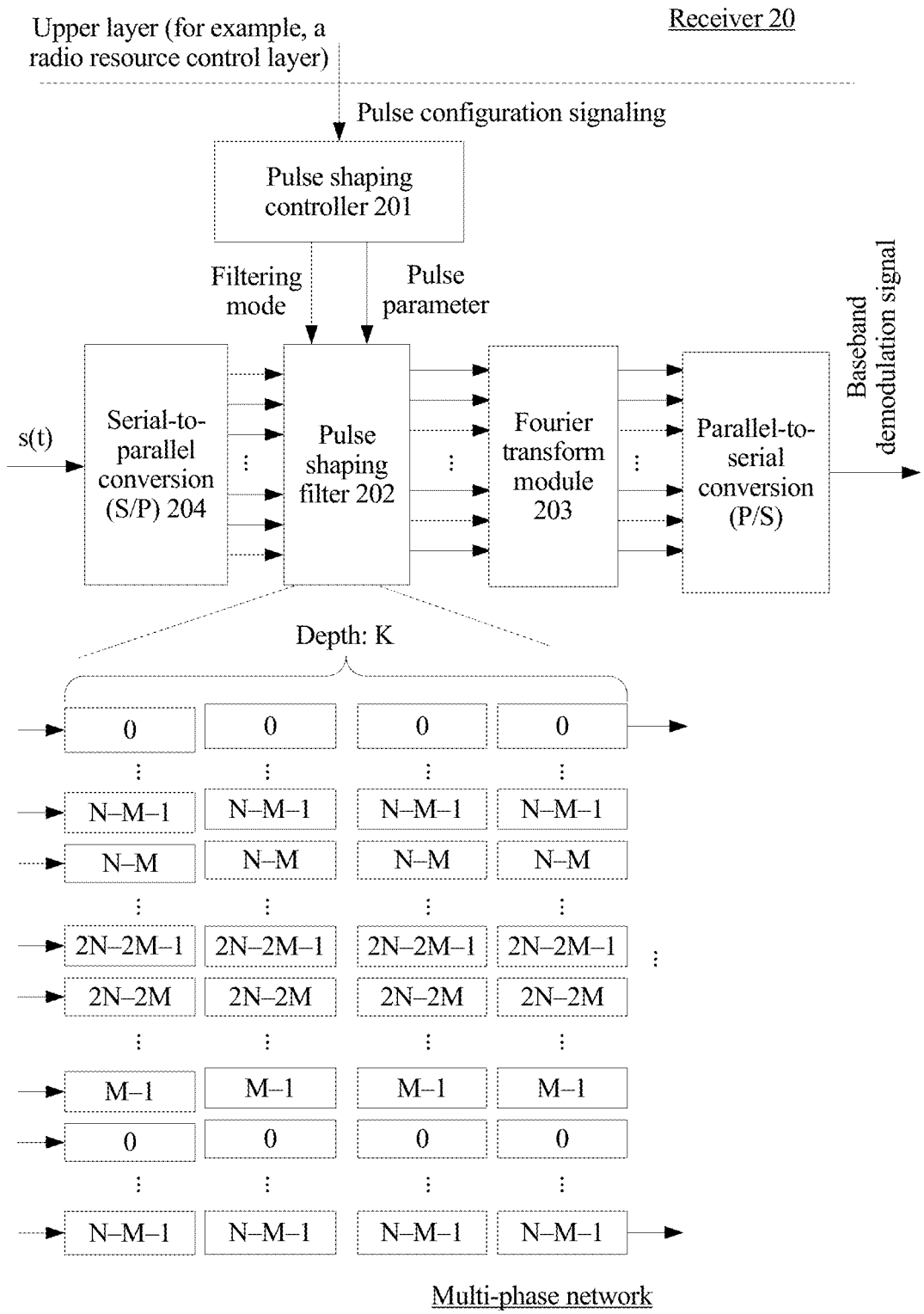
FIG. 8 is another schematic block diagram of implementing a receiver according to this application.

The following describes in detail a specific implementation of the receiver 20 provided in this application based on FIG. 7 and FIG. 8. A receiver 20 corresponding to FIG. 7 is preferably applied to a scenario in which a pulse shape is in a relatively small length (for example, K≤2). A receiver 20 corresponding to FIG. 8 is preferably applied to a scenario in which a pulse shape is in a relatively large length (for example, K>2).

In an implementation of this application, the receiver 20 may be shown in FIG. 7. A serial-to-parallel conversion (S/P) module 204, a pulse shaping controller 201, and a Fourier transform module 203 are consistent with the corresponding modules in the embodiment of FIG. 6. Details are not described again. As shown in FIG. 7, a pulse shaping filter 202 may further include a calculation module 2021, a windowing module 2023, a removing module 2025, and a storage module 2027.

When a first flag bit $Flag_{head}$ is equal to a first enable value (for example, "1"), the calculation module 2021, the windowing module 2023, and the removing module 2025 may be jointly configured to perform pulse shaping processing on a header of an OFDM symbol corresponding to an output signal of the S/P module 204.

The calculation module 2021 may be configured to: for a header part of the OFDM symbol, subtract X sampling points of a tail part of a previous OFDM symbol from the OFDM symbol at X sampling points of the header part, and output, to the windowing module 2023, the OFDM symbol obtained after the subtracting, where X is a positive integer. It should be noted that the subtracting indicates that the X sampling points of the tail part of the previous OFDM symbol are subtracted in time domain. For example, as shown in FIG. 7, X may be equal to $2N_2$ It may be learned with reference to FIG. 3 that a physical meaning of $2N_2$ indicates that overlapping sampling points between the tail part of the previous OFDM symbol and the OFDM symbol are subtracted from the header part of the OFDM symbol.

The windowing module 2023 may be configured to: for a header part of the OFDM symbol obtained after the subtracting, perform windowing processing on the OFDM symbol at M sampling points of the header part by using a former part of a preset windowing function, and output, to the removing module 2025, the OFDM symbol obtained after the windowing processing, where M is a positive integer.

For example, as shown in FIG. 7, M may be equal to $(N_1+N_2)$. It should be noted that M may alternatively be another value based on an actual application requirement, for example, $(N_1+2N_2)$. This is not limited herein.

The removing module 2025 may be configured to: remove a cyclic prefix of a first length for the OFDM symbol obtained after the windowing processing, and output the OFDM symbol obtained after the cyclic prefix is removed.

For example, as shown in FIG. 7, the first length may be equal to $(N_{CP}+N_2)$. In actual application, the first length may alternatively be equal to a sum of $N_{CP}$ and an integral multiple of $N_2$, for example, $(N_{CP}+2N_2)$. Alternatively, the first length may be another value. This is not limited herein.

When a second flag bit $Flag_{tail}$ is equal to a second enable value (for example, "1"), the windowing module 2023 and the removing module 2025 may be jointly configured to perform pulse shaping processing on a tail of the OFDM symbol corresponding to the output signal of the S/P module 204.

The windowing module 2023 may be configured to: for the tail part of the OFDM symbol, perform windowing processing on the OFDM symbol at N sampling points of the tail part by using a latter part of the preset windowing function, and output, to the removing module, the OFDM symbol obtained after the windowing processing, where N is a positive integer.

For example, as shown in FIG. 7, N may be equal to $(N_1+N_2)$. It should be noted that N may alternatively be another value based on an actual application requirement, for example, $(N_1+2N_2)$. This is not limited herein.

The removing module 2025 may be configured to: remove a cyclic suffix of a second length for the OFDM symbol obtained after the windowing processing, and output the OFDM symbol obtained after the cyclic suffix is removed.

For example, as shown in FIG. 7, the second length may be equal to $N_2$. In actual application, the second length may alternatively be equal to a sum of $N_{CP}$ and an integral multiple of $N_2$, for example, $(N_{CP}+2N_2)$ Alternatively, the second length may be another value. This is not limited herein.

In addition, the storage module 2027 in the receiver 20 shown in FIG. 7 may be configured to store, in a storage medium, Y sampling points of the tail part of the OFDM symbol corresponding to the output signal of the S/P module 204, where Y is a positive integer. In specific implementation, Y may be equal to X, in other words, the X sampling points of the tail part of the previous OFDM symbol may be stored in the storage medium. In actual application, Y may alternatively be greater than X. This is not limited herein.

In another implementation of this application, the receiver 20 may be shown in FIG. 8. A serial-to-parallel conversion (S/P) module 204, a pulse shaping controller 201, and a Fourier transform module 203 are consistent with the corresponding modules in the embodiment of FIG. 6. Details are not described again. As shown in FIG. 8, a pulse shaping filter 202 may include: a multi-phase register network, configured to: perform subcarrier-level filtering on an output signal of the S/P module 204 based on a receive-end filter coefficient determined based on a length K and a shape $P_{type}$ of a to-be-configured pulse, and output, to the Fourier transform module 203, a plurality of subcarriers obtained after the filtering.

Specifically, as shown in FIG. 8, a depth of the multi-phase register network is consistent with the length K. The receive-end filter coefficient $\gamma_{rx}$ may be determined based on the length K and $P_{type}$. Input received by the multi-phase register network shown in FIG. 8 is n channels of signals output by the S/P module 204.

In still another implementation of this application, a receiver 20 may include the pulse shaping filter in the embodiment of FIG. 7 and the pulse shaping filter in the embodiment of FIG. 8. The two filters both are connected to a pulse shaping controller 201 and a Fourier transform module 203.

In a possible implementation, the pulse shaping filters in the embodiments respectively corresponding to FIG. 7 and FIG. 8 may be two hardware modules. The two hardware modules are independently integrated into the transmitter 10, and are separately connected to the pulse shaping controller. In actual application, the two hardware modules may alternatively be integrated into the pulse shaping controller as a part of the pulse shaping controller. This application does not limit a layout manner of the two hardware modules in a hardware architecture.

In another possible implementation, the pulse shaping filters in the embodiments respectively corresponding to FIG. 7 and FIG. 8 may be two software modules. The two software modules may run in the pulse shaping controller, or may run on another processing chip that can communicate with the pulse shaping controller. This application does not limit a running environment of the two software modules.

In still another implementation, the pulse shaping controller 201 may be further configured to: determine whether a length K is greater than a preset value (for example, 2); and if the length K is greater than the preset value, output a pulse parameter to the pulse shaping filter in the embodiment of FIG. 8, to trigger the pulse shaping filter in the embodiment of FIG. 8 to perform pulse shaping processing on a communication signal; or if the length K is less than or equal to the preset value, output a pulse parameter to the pulse shaping filter in the embodiment of FIG. 7, to trigger the pulse shaping filter in the embodiment of FIG. 7 to perform pulse shaping processing on a communication signal.

It may be understood that the pulse parameter used in the embodiment of FIG. 7 may be a subset of the preset parameter set shown in Table 1, to be specific, $\{N_1, N_2, Flag_{head}, Flag_{tail}\}$, or the pulse parameter used in the embodiment of FIG. 8 may be another subset of the preset parameter set shown in Table 1, to be specific, $\{K, P_{type}\}$.

For details of a source and a generation manner of the pulse configuration signaling received by the pulse shaping controller 201, refer to a related description in the embodiment of the transmitter 10. This is not limited in this application.

In this embodiment of this application, an upper layer of the receiver 20 may send, to the pulse shaping controller 201 based on different communication scenarios (as shown in FIG. 1A to FIG. 1C), pulse configuration signaling carrying different pulse parameters, to control the pulse shaping filter 202 to configure different pulse shapes for the different communication scenarios, thereby flexibly accommodating the different communication scenarios.

Figure 9:
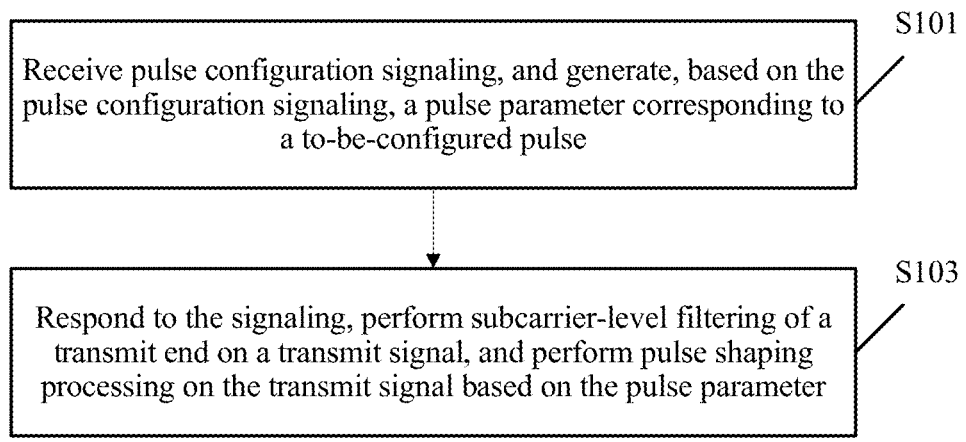
FIG. 9 is a schematic flowchart of a pulse shaping method at a transmit end according to this application.

Referring to FIG. 9, FIG. 9 is a schematic flowchart of a pulse shaping method according to this application. The method is applied to a transmit end, for example, the transmitter 10 shown in FIG. 2, FIG. 4, and FIG. 5. As shown in FIG. 9, the method includes:

S101. Receive pulse configuration signaling, and generate, based on the pulse configuration signaling, a pulse parameter corresponding to a to-be-configured pulse.

S103. Respond to the signaling, perform subcarrier-level filtering of the transmit end on a communication signal, and perform pulse shaping processing on the communication signal based on the pulse parameter.

Specifically, the pulse configuration signaling may carry the pulse parameter, and the pulse parameter may be directly obtained from the signaling. Alternatively, the pulse configuration signaling may carry only indication information of the pulse parameter, and the pulse parameter may be obtained based on the indication information. For example, the signaling carries an index of the pulse parameter in a preset database, and the transmitter 10 is notified of the preset database in advance. Then, the transmitter 10 may find the pulse parameter from the preset database based on the index. The example is merely an implementation of this application, and shall not constitute a limitation. There may be different implementations in actual application.

In this application, the pulse parameter may be all or a part of a preset parameter set. Specifically, for the preset parameter set, refer to Table 1 and related content in the embodiment of FIG. 2. Details are not described herein again.

In this application, a group of pulse parameters correspondingly represent a specific pulse shape. As described in "Definition" in Table 1, a first flag bit $Flag_{head}$ may be used to indicate whether pulse shaping is performed on a symbol header, a second flag bit $Flag_{tail}$ may be used to indicate whether pulse shaping is performed on a symbol tail, a first value $N_1$ may be used to indicate a quantity of sampling points that are in a single symbol, on which pulse shaping is to be performed, and whose magnitude weights are not equal to 1, a second value $N_2$ may be used to indicate a quantity of sampling points that are outside a single symbol and on which pulse shaping is to be performed, $P_{type}$ may be used to indicate a shape of a to-be-configured pulse, and K may be used to indicate a length of a to-be-configured pulse relative to a single symbol period.

This application further provides two specific implementations for S103.

In a first implementation provided in this application, this implementation is preferably applied to a scenario in which a pulse shape is in a relatively small length (for example, K≤2). This implementation is specifically as follows:

When a first flag bit $Flag_{head}$ is equal to a first enable value (for example, "1"), pulse shaping processing may be performed on a header of an OFDM symbol corresponding to the communication signal. Specific steps may include:

S1031. Add a cyclic prefix of a first length to the OFDM symbol. Specifically, for details of a value of the first length, refer to a related description in the embodiment of FIG. 4. The details are not described herein again.

S1032. For a header part of the OFDM symbol with the added cyclic prefix, perform windowing processing on the OFDM symbol at M sampling points of the header part by using a former part of a preset windowing function, where M is a positive integer. Specifically, for details of a value of M, refer to a related description in the embodiment of FIG. 4. The details are not described herein again.

S1033. Add X sampling points of a tail part of a previous OFDM symbol and the OFDM symbol at X sampling points of a header part of the OFDM symbol obtained after the windowing processing, and output the OFDM symbol obtained after the adding. Specifically, for details of a value of X, refer to a related description in the embodiment of FIG. 4. The details are not described herein again.

When a second flag bit $Flag_{tail}$ is equal to a second enable value (for example, "1"), pulse shaping processing may be performed on a tail of the OFDM symbol corresponding to the communication signal. Specific steps may include:

S1035. Add a cyclic suffix of a second length to the OFDM symbol. Specifically, for details of a value of the second length, refer to a related description in the embodiment of FIG. 4. The details are not described herein again.

S1036. For a tail part of the OFDM symbol with the added cyclic suffix of the second length, perform windowing processing on the OFDM symbol at N sampling points of the tail part by using a latter part of the preset windowing function, where N is a positive integer. Specifically, for details of a value of N, refer to a related description in the embodiment of FIG. 4. The details are not described herein again.

S1037. Store, in a storage medium, Y sampling points of a tail part of the OFDM symbol obtained after the windowing processing. Specifically, for details of a value of Y, refer to a related description in the embodiment of FIG. 4. The details are not described herein again.

It should be noted that for details of content that is not mentioned in the first implementation, reference can be made to the embodiment of FIG. 4. The details are not described herein again.

In a second implementation provided in this application, this implementation is preferably applied to a scenario in which a pulse shape is in a relatively large length (for example, K>2). Step S103 may specifically include: performing subcarrier-level filtering on the communication signal based on a transmit-end filter coefficient determined based on a length K and a shape $P_{type}$ of the to-be-configured pulse.

Specifically, it may be learned from the embodiment of FIG. 5 that a transmit-end filter may include a multi-phase register network. A depth of the multi-phase register network is consistent with the length K. The transmit-end filter coefficient $g_{tx}$ may be determined based on the length K and $P_{type}$.

Further, the pulse shaping method provided in this application may further include: before S103 is performed, determining whether the length K is greater than a preset value (for example, 2); and if the length K is less than or equal to the preset value, triggering to perform S103 implemented in the first implementation; or if the length K is greater than the preset value, triggering to perform S103 implemented in the second implementation.

It should be noted that for content that is not mentioned in this application, reference can be made to the embodiments corresponding to FIG. 2 to FIG. 4. Details are not described herein again.

In this embodiment of this application, when subcarrier-level filtering of the transmit end is performed on the communication signal, pulse shaping processing is performed on the communication signal based on the pulse parameter carried in the pulse configuration signaling. Different pulse configuration parameters correspond to different pulse shapes. Therefore, the pulse shape can be flexibly configured at the transmit end, thereby accommodating different communication scenarios.

Figure 10:
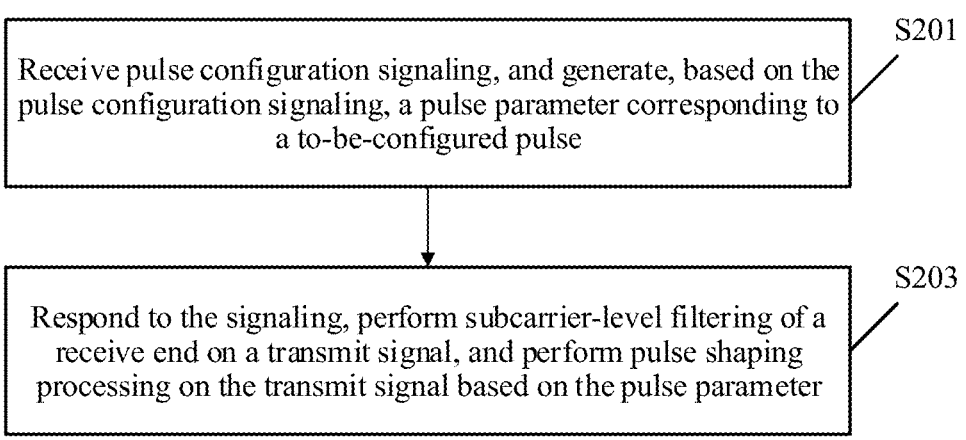
FIG. 10 is a schematic flowchart of a pulse shaping method at a receive end according to this application.

Referring to FIG. 10, FIG. 10 is a schematic flowchart of a pulse shaping method according to this application. The method is applied to a receive end, for example, the receiver 20 shown in FIG. 6 to FIG. 8. As shown in FIG. 10, the method includes:

S201. Receive pulse configuration signaling, where the pulse configuration signaling carries a pulse parameter corresponding to a to-be-configured pulse.

S203. Respond to the signaling, and when performing subcarrier-level filtering of the receive end on a communication signal, perform pulse shaping processing on the communication signal based on the pulse parameter.

Specifically, the pulse configuration signaling may carry the pulse parameter, and the pulse parameter may be directly obtained from the signaling. Alternatively, the pulse configuration signaling may carry only indication information of the pulse parameter, and the pulse parameter may be obtained based on the indication information. For example, the signaling carries an index of the pulse parameter in a preset database, and the receiver 20 is notified of the preset database in advance. Then, the receiver 20 may find the pulse parameter from the preset database based on the index. The example is merely an implementation provided in this application, and shall not constitute a limitation. There may be different implementations in actual application.

In this application, the pulse parameter may be all or a part of a preset parameter set. Specifically, for the preset parameter set, refer to Table 1 and related content in the embodiment of FIG. 2. Details are not described herein again.

In this application, a group of pulse parameters correspondingly represent a specific pulse shape. As described in "Definition" in Table 1, a first flag bit $Flag_{head}$ may be used to indicate whether pulse shaping is performed on a symbol header, a second flag bit $Flag_{tail}$ may be used to indicate whether pulse shaping is performed on a symbol tail, a first value $N_1$ may be used to indicate a quantity of sampling points that are in a single symbol, on which pulse shaping is to be performed, and whose magnitude weights are not equal to 1, a second value $N_2$ may be used to indicate a quantity of sampling points that are outside a single symbol and on which pulse shaping is to be performed, $P_{type}$ may be used to indicate a shape of a to-be-configured pulse, and K may be used to indicate a length of a to-be-configured pulse relative to a single symbol period.

This application further provides two specific implementations for S203.

In a first implementation provided in this application, this implementation is preferably applied to a scenario in which a pulse shape is in a relatively small length (for example, K≤2). This implementation is specifically as follows:

When a first flag bit $Flag_{head}$ is equal to a first enable value (for example, "1"), pulse shaping processing may be performed on a header of an OFDM symbol corresponding to the communication signal. Specific steps may include:

S2031. Subtract X sampling points of a tail part of a previous OFDM symbol from the OFDM symbol at X sampling points of the header part of the OFDM symbol corresponding to the communication signal. Specifically, for details of a value of X, refer to a related description in the embodiment of FIG. 7. The details are not described herein again.

S2032. For a header part of the OFDM symbol obtained after the subtracting, perform windowing processing on the OFDM symbol at M sampling points of the header part by using a former part of a preset windowing function. Specifically, for details of a value of M, refer to a related description in the embodiment of FIG. 7. The details are not described herein again.

S2033. Remove a cyclic prefix of a first length for the OFDM symbol obtained after the windowing processing. Specifically, for details of a value of the first length, refer to a related description in the embodiment of FIG. 4. The details are not described herein again.

When a second flag bit $Flag_{tail}$ equal to a second enable value (for example, "1"), pulse shaping processing may be performed on a tail of the OFDM symbol corresponding to the communication signal. Specific steps may include:

S2035. For the tail part of the OFDM symbol corresponding to the communication signal, perform windowing processing on the OFDM symbol at N sampling points of the tail part by using a latter part of the preset windowing function. Specifically, for details of a value of N, refer to a related description in the embodiment of FIG. 8. The details are not described herein again.

S2036. Remove a cyclic suffix of a second length for the OFDM symbol obtained after the windowing processing. Specifically, for details of a value of the second length, refer to a related description in the embodiment of FIG. 8. The details are not described herein again.

It should be noted that for details of content that is not mentioned in the first implementation, reference can be made to the embodiment of FIG. 7. The details are not described herein again.

In a second implementation provided in this application, this implementation is preferably applied to a scenario in which a pulse shape is in a relatively large length (for example, K>2). Step S203 may specifically include: performing subcarrier-level filtering on the communication signal based on a receive-end filter coefficient determined based on a length K and a shape $P_{type}$ of the to-be-configured pulse.

Specifically, it may be learned from the embodiment of FIG. 8 that a transmit-end filter may include a multi-phase register network. A depth of the multi-phase register network is consistent with the length K. A transmit-end filter coefficient $\gamma_{rx}$ may be determined based on the length K and $P_{type}$.

Further, the pulse shaping method provided in this application may further include: before S203 is performed, determining whether the length K is greater than a preset value (for example, 2); and if the length K is less than or equal to the preset value, triggering to perform S203 implemented in the first implementation; or if the length K is greater than the preset value, triggering to perform S203 implemented in the second implementation.

It should be noted that for content that is not mentioned in this application, reference can be made to the embodiments corresponding to FIG. 6 to FIG. 8. Details are not described herein again.

In this embodiment of this application, when subcarrier-level filtering of the receive end is performed on the communication signal, pulse shaping processing is performed on the communication signal based on the pulse parameter carried in the pulse configuration signaling. Different pulse configuration parameters correspond to different pulse shapes. Therefore, the pulse shape can be flexibly configured at the receive end, thereby accommodating different communication scenarios.

In addition, this application further provides a communications system. The communications system includes a transmitter and a receiver.

The transmitter may be the transmitter 10 described in the embodiments respectively corresponding to FIG. 2, FIG. 4, and FIG. 5. For a function and an implementation of the transmitter, refer to content in FIG. 2, FIG. 4, and FIG. 5. Details are not described herein again.

The receiver may be the receiver 20 described in the embodiments respectively corresponding to FIG. 6 to FIG. 8. For a function and an implementation of the receiver, refer to content in the embodiments of FIG. 6 to FIG. 8. Details are not described herein again.

In some possible implementations, the transmitter may be a communications apparatus for performing the pulse shaping method described in the embodiment of FIG. 9, and the receiver may be a communications apparatus for performing the pulse shaping method described in the embodiment of FIG. 10.

In conclusion, according to the transmitter provided in this application, an upper layer on a transmitter side may send, to a pulse shaping controller based on different communication scenarios, pulse configuration signaling carrying different pulse parameters, to control a pulse shaping filter to configure different pulse shapes for the different communication scenarios, thereby flexibly accommodating the different communication scenarios. According to the receiver provided in this application, an upper layer on a receiver side may send, to a pulse shaping controller based on different communication scenarios, pulse configuration signaling carrying different pulse parameters, to control a pulse shaping filter in the receiver to configure different pulse shapes for the different communication scenarios, thereby flexibly accommodating the different communication scenarios.

A person of ordinary skill in the art may understand that all or some of the processes of the methods in the embodiments may be implemented by a computer program instructing relevant hardware. The program may be stored in a computer readable storage medium. When the program runs, the processes of the method embodiments are performed. The foregoing storage medium includes any medium that can store program code, such as a ROM, a random access memory RAM, a magnetic disk, or an optical disc.

What is claimed is:

1. An apparatus comprising:
a transceiver; and
a processor configured to:
receive, via the transceiver, pulse configuration signaling,
generate, based on the pulse configuration signaling, a pulse parameter corresponding to a to-be-configured pulse, and
respond to the pulse configuration signaling and perform subcarrier-level filtering of the apparatus on a communication signal, and perform pulse shaping processing on the communication signal based on the pulse parameter.

2. The apparatus according to claim 1, wherein when a first flag bit $\text{Flag}_{head}$ is equal to a first enable value, to perform the pulse shaping processing on the communication signal based on the pulse parameter, the processor is configured to:
add a cyclic prefix of a first length to an orthogonal frequency division multiplexing (OFDM) symbol corresponding to the communication signal;
for a header part of the OFDM symbol with the added cyclic prefix of the first length, perform windowing processing on the OFDM symbol at M sampling points of the header part by using a former part of a preset windowing function, wherein M is a positive integer;
add X sampling points of a tail part of a previous OFDM symbol and the OFDM symbol at X sampling points of a header part of the OFDM symbol obtained after the windowing processing, wherein X is a positive integer; and
perform parallel-to-serial conversion on a plurality of channels of signals corresponding to the OFDM symbol obtained after the adding X sampling points, and output, via the transceiver, a converted signal.

3. The apparatus according to claim 2, wherein when a second flag bit $\text{Flag}_{tail}$ is equal to a second enable value, to perform the pulse shaping processing on the communication signal based on the pulse parameter, the processor is configured to:
add a cyclic suffix of a second length to the orthogonal frequency division multiplexing (OFDM) symbol corresponding to the communication signal;
for a tail part of the OFDM symbol with the added cyclic suffix of the second length, perform windowing processing on the OFDM symbol at N sampling points of the tail part by using a latter part of the preset windowing function, wherein N is a positive integer; and
store, in a storage medium, Y sampling points of a tail part of the OFDM symbol obtained after the windowing processing, wherein Y is a positive integer.

4. The apparatus according to claim 1, wherein to perform the pulse shaping processing on the communication signal based on the pulse parameter, the processor is configured to:
perform the subcarrier-level filtering on the communication signal based on a transmit-end filter coefficient determined based on a length K and a shape $P_{type}$ of the to-be-configured pulse, wherein the length K indicates a length of the shape $P_{type}$ of the to-be-configured pulse.

5. The apparatus according to claim 1, wherein to generate, based on the pulse configuration signaling, the pulse parameter corresponding to a to-be-configured pulse, the processor is configured to:
obtain the pulse parameter carried in the pulse configuration signaling; or obtain the pulse parameter based on indication information that is of the pulse parameter and that is carried in the pulse configuration signaling.

6. The apparatus according to claim 1, wherein:

the pulse parameter comprises all or a part of a preset parameter set, and the preset parameter set comprises a first flag bit $Flag_{head}$, a second flag bit $Flag_{tail}$, a first value $N_1$, a second value $N_2$, a shape $P_{type}$ of the to-be-configured pulse, and a length K of the to-be-configured pulse relative to a single symbol period, wherein the length K indicates a length of the shape $P_{type}$ of the to-be-configured pulse; and the first flag bit $Flag_{head}$ is used to indicate whether pulse shaping is performed on a symbol header, the second flag bit $Flag_{tail}$ is used to indicate whether pulse shaping is performed on a symbol tail, the first value $N_1$ is used to indicate a quantity of sampling points that are in a single symbol, on which pulse shaping is to be performed, and whose magnitude weights are not equal to 1, and the second value $N_2$ is used to indicate a quantity of sampling points that are outside a single symbol and on which pulse shaping is to be performed.

7. An apparatus comprising:

a transceiver; and a processor configured to:

receive, via the transceiver, pulse configuration signaling, generate, based on the pulse configuration signaling, a pulse parameter corresponding to a to-be-configured pulse, and respond to the signaling, and perform subcarrier-level filtering of a transmit end on a communication signal, and perform pulse shaping processing on the communication signal based on the pulse parameter.

8. The apparatus according to claim 7, wherein when a first flag bit $Flag_{head}$ is equal to a first enable value, to perform the pulse shaping processing on the communication signal based on the pulse parameter, the processor is configured to:

subtract X sampling points of a tail part of a previous orthogonal frequency division multiplexing (OFDM) symbol from an OFDM symbol at X sampling points of a header part of the OFDM symbol corresponding to the communication signal, wherein X is a positive integer;

for a header part of the OFDM symbol obtained after subtracting, perform windowing processing on the OFDM symbol at M sampling points of the header part by using a former part of a preset windowing function, wherein M is a positive integer; and remove a cyclic prefix of a first length for the OFDM symbol obtained after the windowing processing.

9. The apparatus according to claim 8, wherein when a second flag bit $Flag_{tail}$ is equal to a second enable value, to perform the pulse shaping processing on the communication signal based on the pulse parameter, the processor is configured to:

for N sampling points of a tail part of the orthogonal frequency division multiplexing (OFDM) symbol corresponding to the communication signal, perform windowing processing on the OFDM symbol at the N sampling points by using a latter part of the preset windowing function, wherein N is a positive integer; and remove a cyclic suffix of a second length for the OFDM symbol obtained after the windowing processing.

10. The apparatus according to claim 7, wherein to perform the pulse shaping processing on the communication signal based on the pulse parameter, the processor is configured to:

perform the subcarrier-level filtering on the communication signal based on a receive-end filter coefficient determined based on a length K and a shape $P_{type}$ of the to-be-configured pulse.

11. The apparatus according to claim 7, wherein to generate, based on the pulse configuration signaling, the pulse parameter corresponding to a to-be-configured pulse, the processor is configured to:

obtain the pulse parameter carried in the pulse configuration signaling; or obtain the pulse parameter based on indication information that is of the pulse parameter and that is carried in the pulse configuration signaling.

12. The apparatus according to claim 7, wherein:

the pulse parameter comprises all or a part of a preset parameter set, and the preset parameter set comprises a first flag bit $Flag_{head}$, a second flag bit $Flag_{tail}$, a first value $N_1$, a second value $N_2$, a shape $P_{type}$ of the to-be-configured pulse, and a length K of the to-be-configured pulse relative to a single symbol period, wherein the length K indicates a length of the shape $P_{type}$ of the to-be-configured pulse; and the first flag bit $Flag_{head}$ is used to indicate whether pulse shaping is performed on a symbol header, the second flag bit $Flag_{tail}$ is used to indicate whether pulse shaping is performed on a symbol tail, the first value $N_1$ is used to indicate a quantity of sampling points that are in a single symbol, on which pulse shaping is to be performed, and whose magnitude weights are not equal to 1, and the second value $N_2$ is used to indicate a quantity of sampling points that are outside a single symbol and on which pulse shaping is to be performed.

13. A pulse shaping method, applied to a transmit end, the method comprising:

receiving pulse configuration signaling;

generating, based on the pulse configuration signaling, a pulse parameter corresponding to a to-be-configured pulse; and responding to the signaling, performing subcarrier-level filtering of the transmit end on a communication signal, and performing pulse shaping processing on the communication signal based on the pulse parameter.

14. The method according to claim 13, wherein when a first flag bit $Flag_{head}$ is equal to a first enable value, the performing pulse shaping processing on the communication signal based on the pulse parameter comprises:

adding a cyclic prefix of a first length to an orthogonal frequency division multiplexing (OFDM) symbol corresponding to the communication signal;

for a header part of the OFDM symbol with the added cyclic prefix of the first length, performing windowing processing on the OFDM symbol at M sampling points of the header part by using a former part of a preset windowing function, wherein M is a positive integer;

adding X sampling points of a tail part of a previous OFDM symbol and the OFDM symbol at X sampling points of a header part of the OFDM symbol obtained after the windowing processing, wherein X is a positive integer; and performing parallel-to-serial conversion on a plurality of channels of signals corresponding to the OFDM symbol obtained after the adding X sampling points, and outputting a converted signal.

15. The method according to claim 14, wherein when a second flag bit $Flag_{tail}$ is equal to a second enable value, performing the pulse shaping processing on the communication signal based on the pulse parameter comprises:

adding a cyclic suffix of a second length to the orthogonal frequency division multiplexing (OFDM) symbol corresponding to the communication signal;

for a tail part of the OFDM symbol with the added cyclic suffix of the second length, performing windowing processing on the OFDM symbol at N sampling points of the tail part by using a latter part of the preset windowing function, wherein N is a positive integer; and storing, in a storage medium, Y sampling points of a tail part of the OFDM symbol obtained after the windowing processing, wherein Y is a positive integer.

16. The method according to claim 13, wherein the performing pulse shaping processing on the communication signal based on the pulse parameter comprises:

performing the subcarrier-level filtering on the communication signal based on a transmit-end filter coefficient determined based on a length K and a shape $P_{type}$ of the to-be-configured pulse, wherein the length K indicates a length of the shape $P_{type}$ of the to-be-configured pulse.

17. The method according to claim 13, wherein the generating, based on the pulse configuration signaling, the pulse parameter corresponding to a to-be-configured pulse comprises:

obtaining the pulse parameter carried in the pulse configuration signaling; or obtaining the pulse parameter based on indication information that is of the pulse parameter and that is carried in the pulse configuration signaling.

18. The method according to claim 13, wherein:

the pulse parameter comprises all or a part of a preset parameter set, and the preset parameter set comprises a first flag bit $Flag_{head}$, a second flag bit $Flag_{tail}$, a first value $N_1$, a second value $N_2$, a shape $P_{type}$ of the to-be-configured pulse, and a length K of the to-be-configured pulse relative to a single symbol period, wherein the length K indicates a length of the shape $P_{type}$ of the to-be-configured pulse; and the first flag bit $Flag_{head}$ is used to indicate whether pulse shaping is performed on a symbol header, the second flag bit $Flag_{tail}$ is used to indicate whether pulse shaping is performed on a symbol tail, the first value $N_1$ is used to indicate a quantity of sampling points that are in a single symbol, on which pulse shaping is to be performed, and whose magnitude weights are not equal to 1, and the second value $N_2$ is used to indicate a quantity of sampling points that are outside a single symbol and on which pulse shaping is to be performed.

* * * * *